US012785005B2

(12) United States Patent
Deguchi et al.

(10) Patent No.: US 12,785,005 B2
(45) Date of Patent: Nov. 3, 2026

(54) SWITCH DEVICE FOR WORK VEHICLE

(71) Applicant: Yanmar Holdings Co., Ltd., Osaka (JP)

(72) Inventors: Takashi Deguchi, Fukuoka (JP); Naoto Kageyama, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 187 days.

(21) Appl. No.: 18/275,426

(22) PCT Filed: Jan. 24, 2022

(86) PCT No.: PCT/JP2022/002422

§ 371 (c)(1),
(2) Date: Aug. 2, 2023

(87) PCT Pub. No.: WO2022/168657

PCT Pub. Date: Aug. 11, 2022

(65) Prior Publication Data

US 2024/0038458 A1 Feb. 1, 2024

(30) Foreign Application Priority Data

Feb. 5, 2021 (JP) ................................ 2021-017431

(51) Int. Cl.
*H01H 13/02* (2006.01)
*B60K 35/10* (2024.01)
*H01H 13/70* (2006.01)

(52) U.S. Cl.
CPC ........... *H01H 13/023* (2013.01); *B60K 35/10* (2024.01); *H01H 13/70* (2013.01); *B60K 2360/128* (2024.01); *B60K 2360/345* (2024.01)

(58) Field of Classification Search
CPC .. H01H 13/023; H01H 13/70; H01H 2009/16; H01H 2009/161;
(Continued)

(56) References Cited

U.S. PATENT DOCUMENTS 7,425,891 B2 * 9/2008 Colburn ................ B60K 35/28 701/1
7,671,851 B1 * 3/2010 Pryor .................... B60K 35/22 345/184
(Continued)

FOREIGN PATENT DOCUMENTS

DE 102009000536 A1 8/2010
EP 2217462 B1 12/2011
(Continued)

OTHER PUBLICATIONS

Notice of Reasons for Refusal: Patent Application Number: Japanese Patent Application No. 2024 to 066275 Draft date: Jun. 24, 2025.

*Primary Examiner* — Anthony R Jimenez
(74) *Attorney, Agent, or Firm* — Organization

(57) ABSTRACT

A switch device for a work vehicle comprises a plurality of switches and light-emitting sections. The plurality of switches are used in the operation of a work vehicle. Each light-emitting section corresponds to at least some switches from among the plurality of switches. Each light-emitting section corresponding to some of the switches is configured to be capable of switching between a lighted state and a non-lighted state.

9 Claims, 10 Drawing Sheets

(58) Field of Classification Search
CPC ......... H01H 2009/164; H01H 2009/18; H01H 2009/182; H01H 2009/183; H01H 2009/186; H01H 2009/187; H01H 3/00; H01H 3/12; H01H 9/16; H01H 9/18; H01H 9/161; H01H 9/181; H01H 9/182; H01H 2003/12; H01H 13/00; H01H 13/02; H01H 13/14; H01H 13/50; H01H 13/52; B60K 2360/128; B60K 2360/345; B60K 35/10
USPC .......................................................... 200/310
See application file for complete search history.

(56) References Cited

U.S. PATENT DOCUMENTS

| | | | | |
|---|---|---|---|---|
| 9,616,812 | B2 * | 4/2017 | Sawayanagi ............. | B60Q 3/68 |
| 2008/0218371 | A1 * | 9/2008 | Joo ......................... | H04M 1/22 345/170 |

FOREIGN PATENT DOCUMENTS

| | | | |
|---|---|---|---|
| EP | 2402840 | A1 | 1/2012 |
| JP | H04101321 | U | 9/1992 |
| JP | 2020031547 | A | 3/2020 |

* cited by examiner

SWITCH DEVICE FOR WORK VEHICLE

CROSS-REFERENCE

This application is a US National Stage Application under 35 U.S.C. § 371 of International Application No. PCT/JP2022/002422 filed Jan. 24, 2022, which claims foreign priority of JP2021-017431 filed Feb. 5, 2021 and the disclosures of which are hereby incorporated by reference in their entirety.

TECHNICAL FIELD

The present invention relates to a switch device for working vehicles.

BACKGROUND ART

An illumination type push button switch disclosed in Patent Literature 1 includes a casing where a push button is arranged, a switch body causing a switch contact to open and close according to the pushing down of the push button, and light sources housed in the casing separately from the switch body.

CITATION LIST

Patent Literature

JP 2005-78989 A

DISCLOSURE OF INVENTION

Problems to be Solved by the Invention

In the push button switch of Patent Literature 1, if a plurality of push buttons and switch bodies are arranged in the casing, a corresponding number of light sources are housed in the casing and collectively controlled in emission of light.

If all the push buttons glow at a time, a push button unnecessary for an operator that may be included in the arranged push buttons is hardly recognizable to the operator, which reduces the convenience.

The present invention has been made in view of the problem as above, and an object of the present invention is to provide a switch device for working vehicles that allows an operator to readily recognize that a switch is or is not unnecessary.

Means for Solving the Problems

A switch device for working vehicles according to the present invention includes multiple switches and light emitting parts. The multiple switches are used to operate a working vehicle. The light emitting parts respectively correspond to at least some switches out of the multiple switches. The light emitting parts corresponding to the some switches are each so formed as to be switchable between a turned-on state and a turned-off state.

Effect of the Invention

According to the present invention, an operator readily recognizes that a switch is or is not unnecessary.

DESCRIPTION OF EMBODIMENTS

Figure 1:
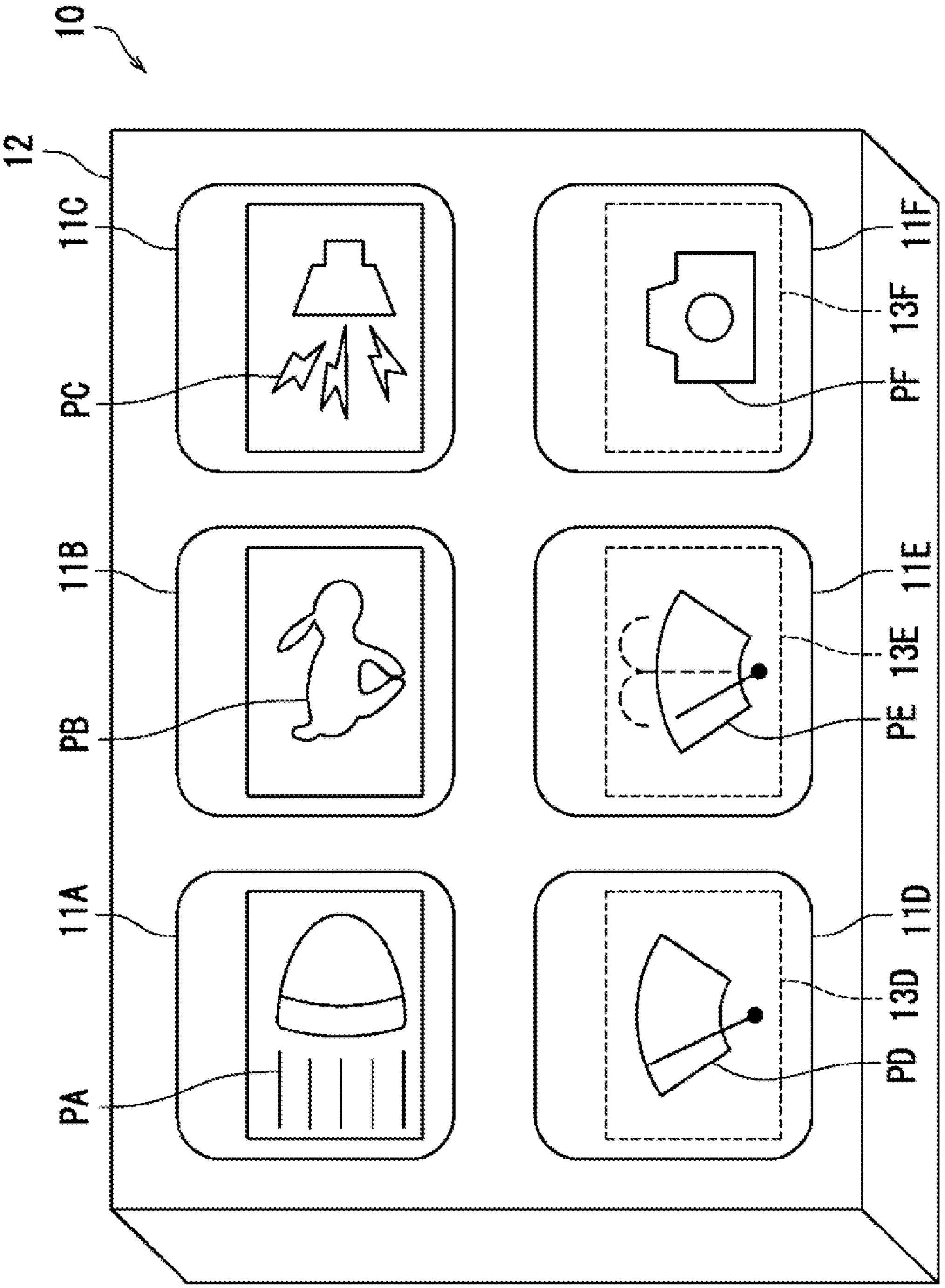
FIG. 1 is a schematic diagram of a switch device.

In the following, embodiments of the present invention are described with reference to the drawings. Identical or equivalent components in the drawings are given identical reference signs and not described repeatedly.

A switch device for working vehicles is initially described in a first embodiment, then a switch system for working vehicles is described in a second embodiment and a working vehicle equipped with the switch device is described in a third embodiment.

First Embodiment

A switch device for working vehicles according to the present embodiment is a switch device that is arranged in a cab of a working vehicle and used to operate the working vehicle, for instance.

This switch device includes regular switches related to functions regularly imparted to the working vehicle, and optional switches related to functions optionally imparted. For convenience, an optional switch that a specified function is assigned to and that is actually used is referred to as a functional switch, and an optional switch that any specified functions are not assigned to and that is not actually used is referred to as an unfunctional switch. The "regular switches" are equivalent to "other switches" in the present invention, and the "optional switches" are equivalent to "some switches" in the present invention.

In the switch device according to the present embodiment, the optional switches are switchable by light emitting elements between a lighted state and an unlighted state (hereinafter also referred to as "lighted and unlighted states"), which makes it possible to distinguish the functional switch and the unfunctional switch from each other.

The switch device for working vehicles according to the present embodiment is described below by giving several working examples. In the following working examples, some of multiple switches are assumed as optional switches and the other switches are assumed as regular switches, while all the switches may be assumed as optional switches.

Working Example

Figure 2:
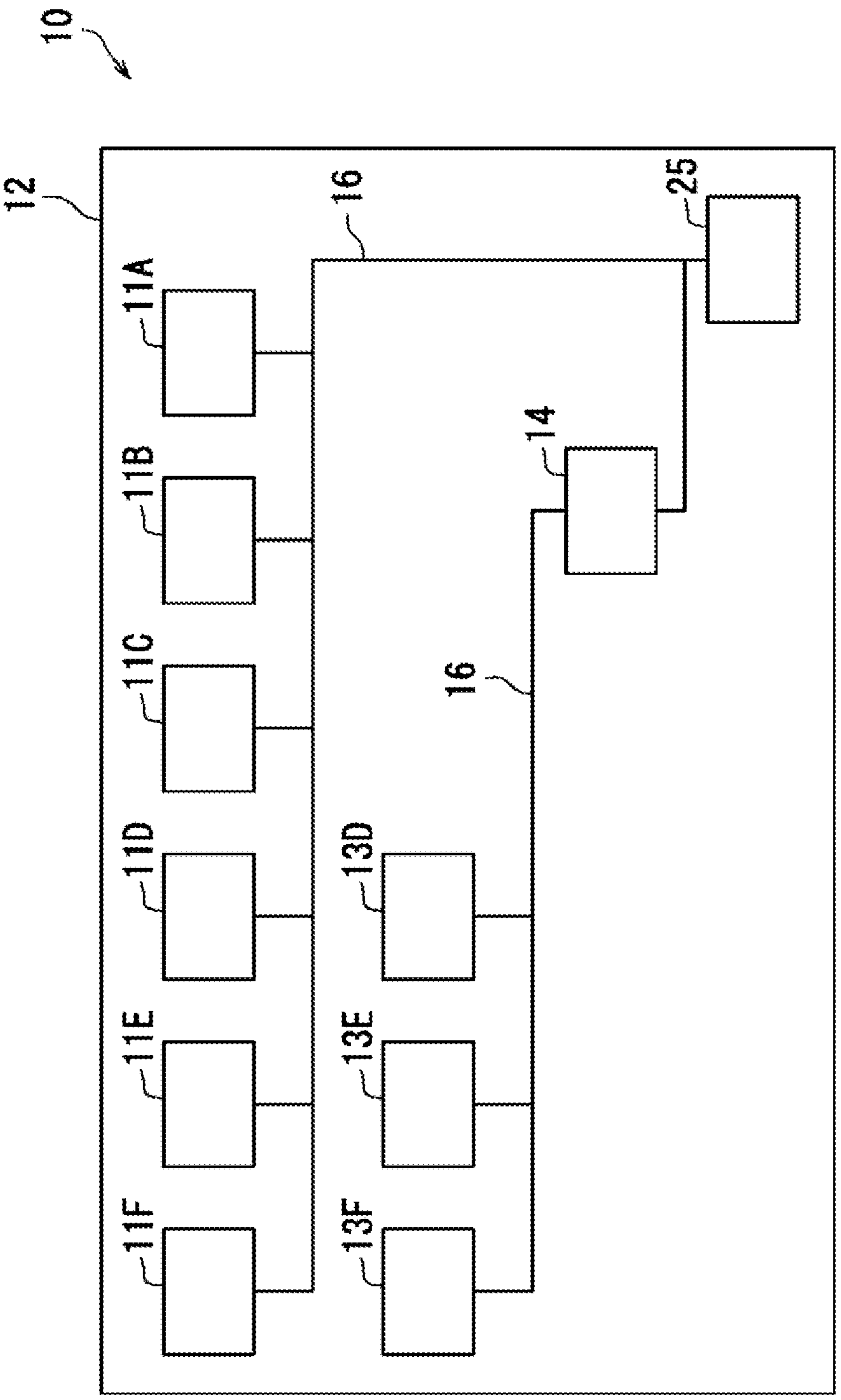
FIG. 2 is a block diagram illustrating the switch device.

A working example of the switch device for working vehicles according to the present embodiment is described with reference to FIGS. 1 and 2. FIG. 1 is a diagram illustrating a rough configuration of a switch device of the present working example, and FIG. 2 is a block diagram of the switch device.

In a switch device 10 according to the present working example, light emitting elements 13 are only arranged on optional switches. As illustrated in FIGS. 1 and 2, the switch device 10 includes a device body 12, switches 11, the light emitting elements 13, and a controller 14. The switches 11, the light emitting elements 13, and the controller 14 are connected to one another through wiring 16. The "light emitting elements 13" are equivalent to "light emitting parts" in the present invention.

The device body 12 is made in the form of a case or panel, for instance, and is capable of housing or supporting the switches 11, the light emitting elements 13, and the controller 14.

The switches 11 are each constituted of a push button switch, for instance, and receive operations by an operator. In each switch 11, based on an operation by the operator, an operation signal (ON information or OFF information) indicating that the relevant switch has or has not been pushed down is generated, and the operation signal is output to a working vehicle through the wiring 16. Thus, the working vehicle exerts a function assigned to the relevant switch. For instance, if the operator pushes down a switch 11 (switch 11B to be described later) that a function for regulating an engine speed is assigned to, ON information indicating that the switch 11B has been pushed down is output to the working vehicle through the wiring 16. In response to the ON information, the working vehicle increases the engine speed. If the switch 11B is pushed down again in a state (ON state) where the switch 11B has once been pushed down, OFF information is output to the working vehicle. In response to the OFF information, the working vehicle decreases the engine speed.

In the switch device 10, six switches 11 (switches 11A through 11F) are provided on the device body 12, for instance. The switches 11A through 11F are formed so that functions corresponding to various operations of the working vehicle may be assignable to the respective switches. In the example illustrated in FIG. 1, a function to turn on and off a headlight of the working vehicle is assignable to the switch 11A. Similarly, a function for regulating the engine speed is assignable to the switch 11B, a function to instruct that a sound output section (buzzer) is or is not to be caused to output a sound is assignable to the switch 11C, a function to switch movement of a wiper is assignable to the switch 11D, a function to switch movement of a washer of the wiper is assignable to the switch 11E, and a function to switch display on a display section (monitor) to a camera image is assignable to the switch 11F. Assignment of the above functions is decided for each working vehicle. In the present working example, the switches 11A through 11C are regular switches and the switches 11D through 11F are optional switches. If the working vehicle is a cabin type working vehicle, for instance, a wiper and a washer are necessary, so that a wiper movement function and a washer function are imparted to the working vehicle, and the switches 11D and 11E are functional switches. On the other hand, if the working vehicle is not provided with a camera for peripheral monitoring, the function to switch the display on the display section to the camera image is not imparted and the switch 11F is an unfunctional switch. The number of the switches 11 provided on the device body 12 is not limited to six.

To top faces of the switches 11, functional indications P are attached, and the functional indications P make it possible to distinguish the functions assignable to the switches 11 from one another.

In the example illustrated in FIG. 1, a functional indication PA indicating the function to turn on and off the headlight is attached to the switch 11A. Similarly, a functional indication PB indicating the function for regulating the engine speed is attached to the switch 11B, a functional indication PC indicating the function to instruct that the sound output section is or is not to be caused to output a sound is attached to the switch 11C, a functional indication PD indicating the function to switch the movement of the wiper is attached to the switch 11D, a functional indication PE indicating the function to switch the movement of the washer of the wiper is attached to the switch 11E, and a functional indication PF indicating the function to switch the display on the display section to the camera image is attached to the switch 11F.

Figure 3:
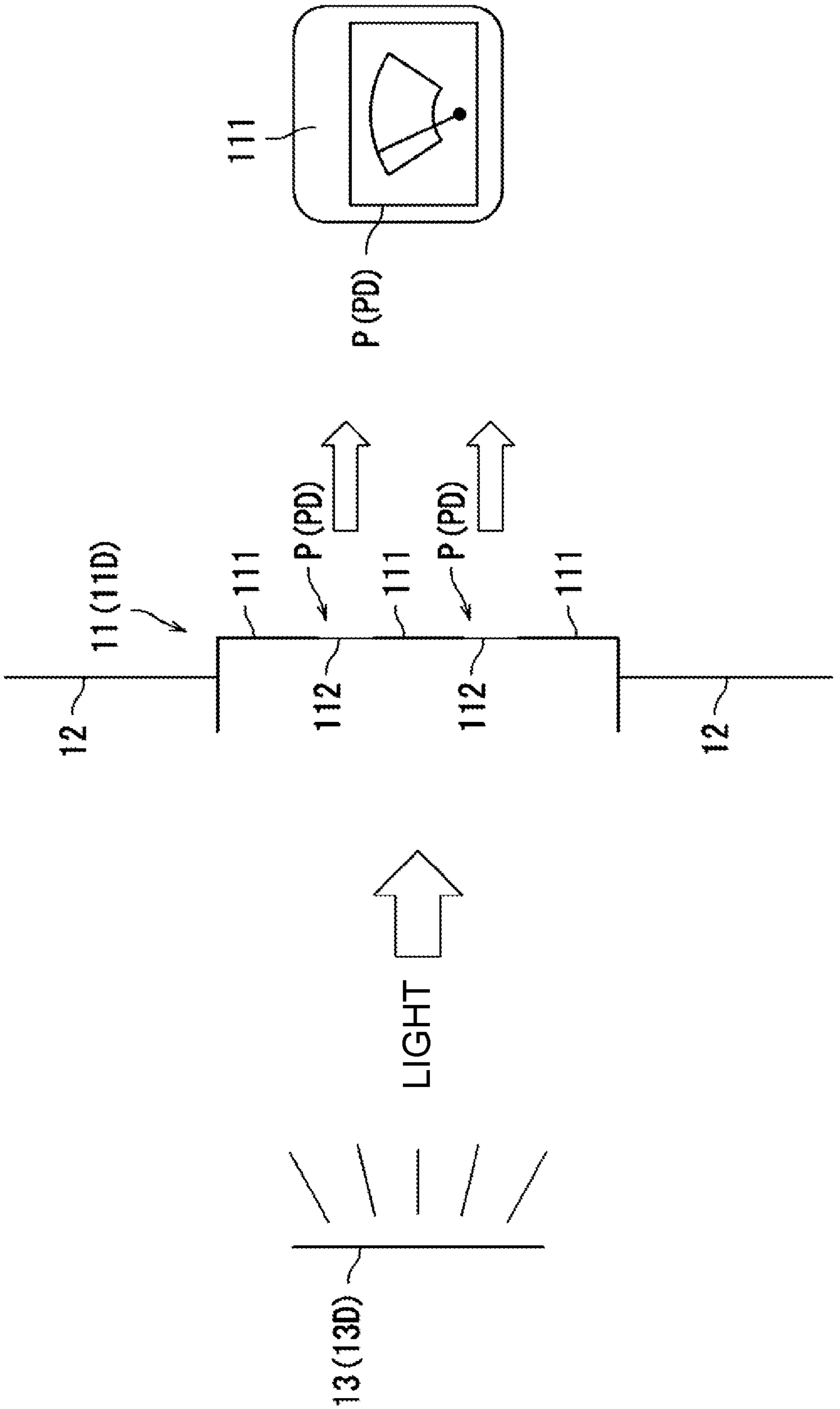
FIG. 3 is a schematic cross-sectional view of the switch device taken at a switch.

Next, the lighted and unlighted states of the optional switches are described with reference to FIG. 3. FIG. 3 is a schematic cross-sectional view of the switch device taken at the switch 11D.

As illustrated in FIG. 3, the optional switches 11D through 11F can be constituted of non-translucent members 111 that do not transmit light and translucent members 112 that transmit light. For instance, the top faces (faces visually recognized by the operator) of the switches 11 are constituted of the translucent members 112 so as to allow the operator to visually recognize turned-on and turned-off states of the light emitting elements 13.

In particular, the functional indications P are constituted of the translucent members 112, and the functional indications P are thus switched in visibility according to the turned-on and turned-off states of the light emitting elements 13. In other words, the functional indications P are visible to the operator if the light emitting elements 13 are on, and invisible to the operator if the light emitting elements 13 are off. If the switches 11 are colored gray as a whole and the functional indications P are colored white with a high pellucidity, for instance, a difference in color or brightness between the functional indications P and the other parts is not so great in the turned-off state, but is considerable in the turned-on state in response to the transmission of light. The visibility as mentioned above refers to a feature indicating that the operator is able or unable to readily grasp the contents of indication at a glance, so that "invisibleness" does not mean that the functional indications P are not visible at all.

In the present working example, the functional indications P for the regular switches 11A through 11C are constituted of the non-translucent members 111 and are different in color from the other parts. For instance, the switches 11 are colored gray as a whole, and the functional indications P are colored white. Such coloring allows the operator to recognize the contents of the functional indications P.

As illustrated in FIG. 2, on the optional switches 11D through 11F among the switches 11 provided on the device body 12, corresponding light emitting elements 13 (13D through 13F) are provided, respectively. The light emitting elements 13 are constituted of LEDs (light emitting diodes), for instance, and emit light in the turned-on state toward back faces of the switches 11. The emitted light is transmitted through the functional indications P of the switches 11, which indications are constituted of the translucent members 112. On the other hand, the light emitting elements 13 in the turned-off state do not emit light. The light emitting elements 13 are separately switched between the turned-on and turned-off states based on the control by the controller 14. Consequently, the light emitting elements 13D and 13E, which correspond to the optional switches (functional switches) 11D and 11E, come into the turned-on state, while the light emitting element 13F, which corresponds to the optional switch (unfunctional switch) 11F, comes into the turned-off state. Regions in surfaces of the switches 11, to which regions the functional indications P are attached, are referred to as lighting regions in some cases.

The controller 14 implements turning on and off control of the light emitting elements 13 based on a signal from the working vehicle. If receiving a start-up signal indicating that the working vehicle has come into a key on state from the working vehicle as a movement signal, for instance, the controller 14 transmits a control signal S instructing of turning on control to the light emitting elements 13D and 13E, which correspond to the functional switches 11D and 11E, based on corresponding function information. If receiving a stop signal indicating that the working vehicle has come into a key off state from the working vehicle as a movement signal, the controller 14 transmits a control signal S instructing of turning off control to the light emitting elements 13D and 13E. Thus, the light emitting elements 13 emit light (are turned on) if receiving a control signal S indicating the turned-on state from the controller, and do not emit light (are turned off) if receiving a control signal S indicating the turned-off state from the controller. The corresponding function information refers to information that indicates a correspondence relationship between the switches 11 and functions of the working vehicle assigned to the switches 11, and, as an example, the switch 11A and a function to control turning on and off of the headlight are made to correspond to each other. The corresponding function information is stored in a storage unit not illustrated.

(Turning on Control and Turning Off Control in Switch Device)

Next, the turned-on state and the turned-off state in the switch device, which has the configuration as above, are described with reference to FIG. 4.

Figure 4:
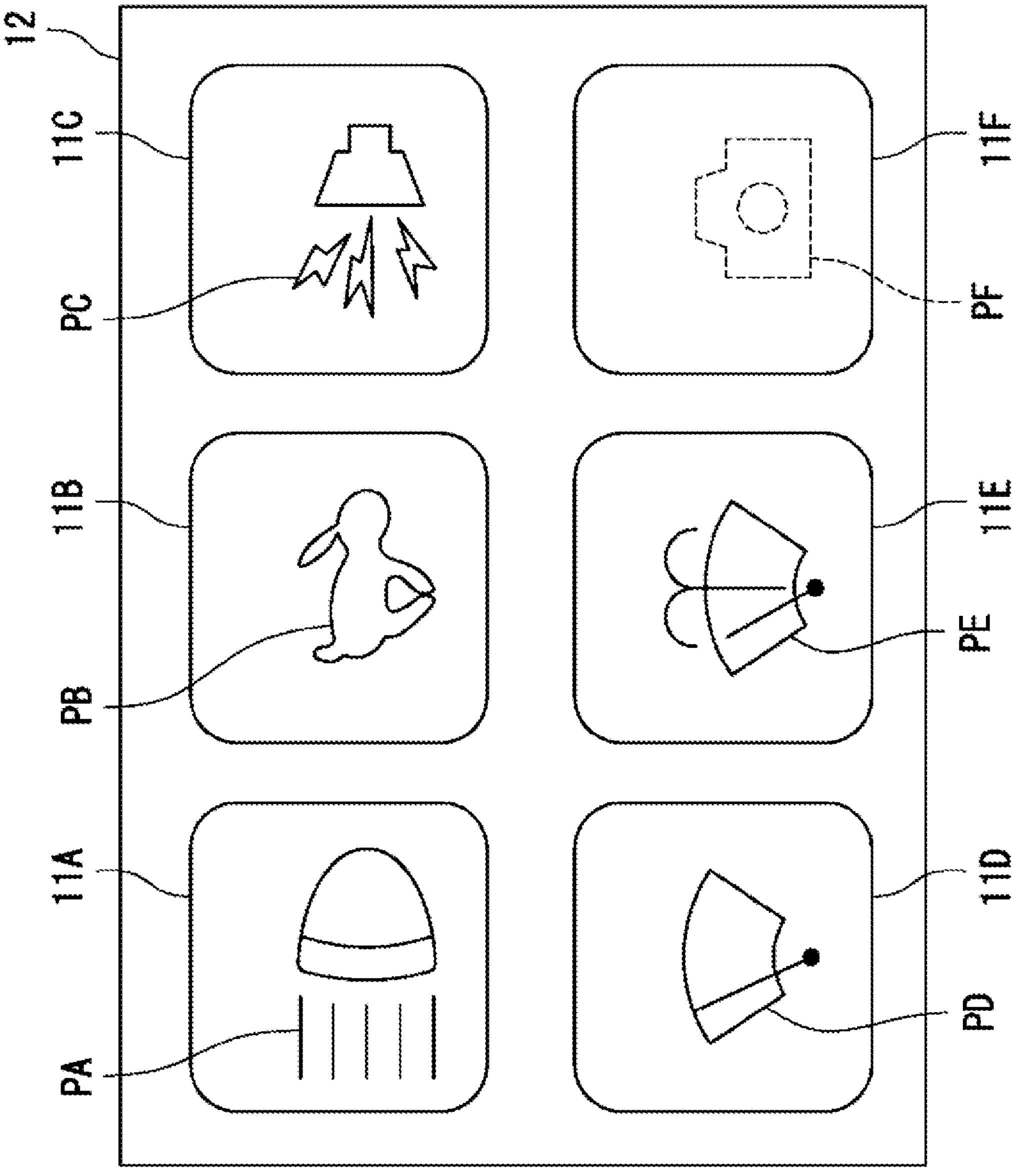
FIG. 4 is a diagram illustrating a state where, in the switch device illustrated in FIG. 1, a light emitting element corresponding to a functional switch is controlled and switched to a turned-on state and a light emitting element corresponding to an unfunctional switch is controlled and switched to a turned-off state.

FIG. 4 is a diagram illustrating a state where, in the switch device 10 illustrated in FIG. 3, the light emitting elements 13D and 13E, which correspond to the functional switches 11D and 11E, are controlled and switched to the turned-on state and the light emitting element 13F, which corresponds to the unfunctional switch 11F, is controlled and switched to the turned-off state. In FIG. 4 and succeeding figures, the turned-on state is indicated with solid lines and the turned-off state is indicated with broken lines at the regular switches 11A through 11C and the optional switches 11D through 11F.

In the example illustrated in FIG. 4, the controller 14 refers to the corresponding function information in the storage unit and recognizes the switches 11D and 11E among the optional switches 11D through 11F as functional switches so as to subject the light emitting elements 13D and 13E to control to switch to the turned-on state.

In addition, the controller 14 recognizes the switch 11F among the optional switches 11D through 11F as an unfunctional switch so as not to subject the light emitting element 13F to the control to switch to the turned-on state. In this way, the functional switches 11D and 11E are lighted while the unfunctional switch 11F is not lighted, so that the functional switches 11D and 11E are only presented to the operator, which assists the operator in judgement.

As described above, in the switch device 10 of the present working example, an operation signal generated based on a switch operation by the operator is output to the working vehicle. As a result, the working vehicle moves according to the operation by the operator.

The light emitting elements 13 are switched between the turned-on and turned-off states so as to make it possible to visually recognize that the optional switches 11D through 11F are available or unavailable.

Thus, functions to be imparted depending on the type or specifications of the working vehicle are assigned to the optional switches 11D through 11F so as to form a switch device responding to the type or specifications of the working vehicle, without changing a hardware configuration of the switch device 10.

[Modification 1]

Figure 5:
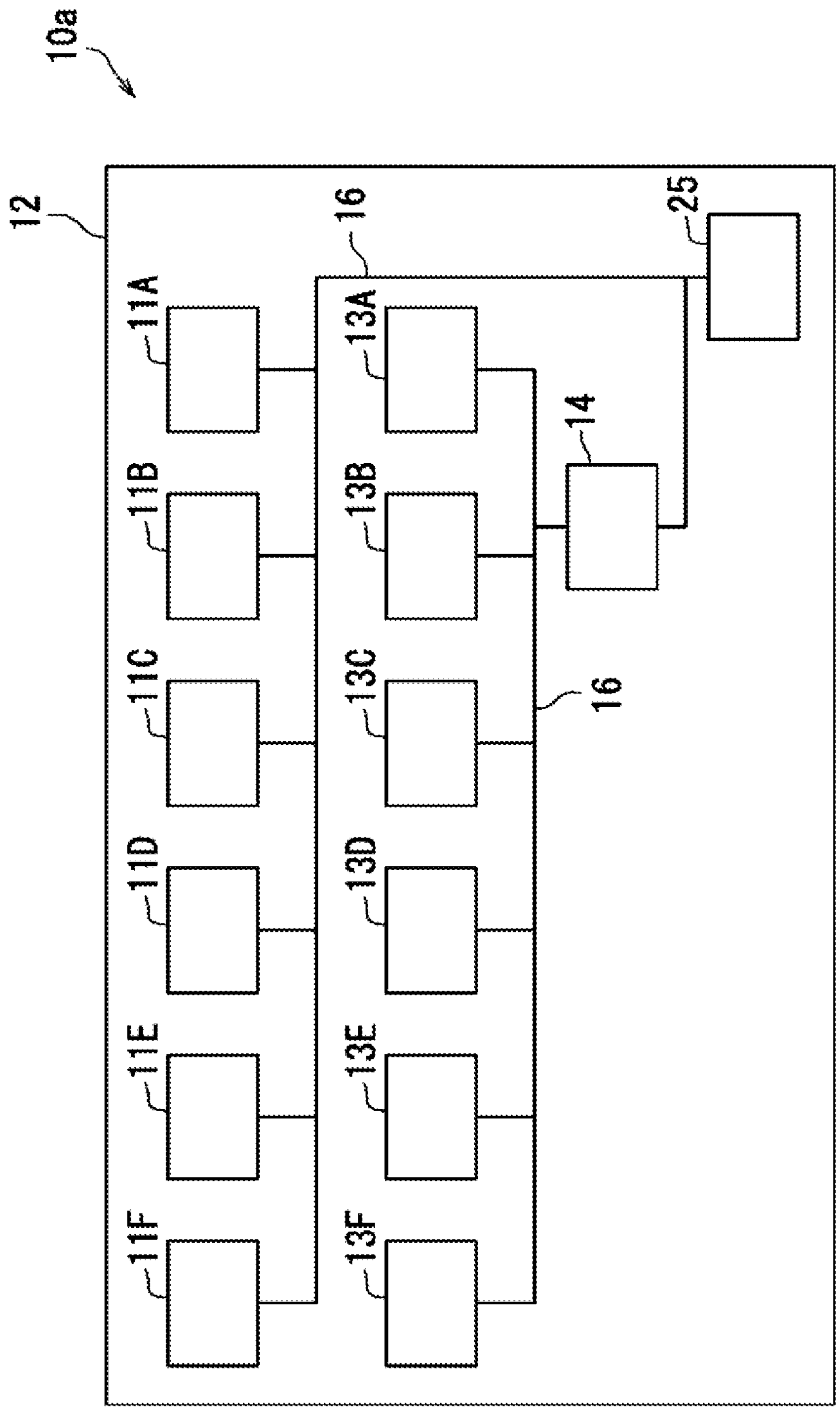
FIG. 5 is a block diagram illustrating a switch device according to Modification 1.

Next, a modification of the switch device according to the present embodiment is described with reference to FIG. 5. FIG. 5 is a block diagram of a switch device 10*a* according to the present modification.

In the switch device of the present modification, the optional switches 11D through 11F are capable of being separately subjected to the turning on and off control, and the regular switches 11A through 11C are capable of being collectively subjected to the turning on and off control.

The switch device 10*a* according to the present modification is different from the switch device 10 according to the working example as above in that light emitting elements 13 corresponding to the regular switches 11 are provided. The following description is made on the switch device 10*a*, focusing on differences from the switch device 10.

In the switch device 10*a*, the functional indications PA through PC of the regular switches 11A through 11C come in "white", a color that the operator visually recognizes with ease in a light place, for instance. On the other hand, the functional indications PD through PF of the optional switches 11D through 11F are "pellucid" in color, that is to say, come in a color that the operator cannot visually recognize with ease in a light place.

The switch device 10*a* of the present modification includes light emitting elements 13A through 13C corresponding to the regular switches 11A through 11C in addition to the light emitting elements 13D through 13F, which correspond to the optional switches 11D through 11F.

The light emitting elements 13A through 13C are arranged inside the regular switches 11A through 11C, respectively, and are capable of lighting back faces of the regular switches 11A through 11C from the inside of the regular switches 11A through 11C.

The light emitting elements 13A through 13C are connected to the controller 14 through the wiring 16, and collectively switched between the turned-on and turned-off states based on the control by the controller 14.

In the example in FIG. 5, the light emitting elements 13A through 13C are separately arranged on the regular switches 11A through 11C, while such arrangement is non-limitative and the regular switches 11A through 11C may collectively be lighted by a single light emitting element 13.

The regular switches 11A through 11C according to the present modification are constituted of the non-translucent members 111 and the translucent members 112. Translucent members 112*a* that constitute the functional indications PA through PC are different in color or shade of color from the translucent members 112 as above, and are colored white insofar as the members transmit light (that is to say, are kept translucent), for instance. Consequently, the functional indications PA through PC of the switches 11A through 11C appear white to the operator and are readily recognizable in a light place such as a workshop in the daytime even if the light emitting elements 13A through 13C are off.

If the light emitting elements 13A through 13C are on, light emitted from the light emitting elements 13A through 13C is transmitted through the translucent members 112*a* similarly to the example illustrated in FIG. 3. As a result, the functional indications PA through PC appear to the operator to be of emission colors of the light emitting elements 13A through 13C even in a dark place such as a workshop in the nighttime. If the emission colors of the light emitting elements 13A through 13C are each "white", for instance, the functional indication PA appears bright and white to the operator and is readily recognizable in a light place and a dark place.

The controller 14 collectively controls the light emitting elements 13A through 13C corresponding to the regular switches 11A through 11C for the switch between the turned-on and turned-off states.

For instance, the controller 14 subjects the light emitting elements 13A through 13C corresponding to the regular switches 11A through 11C to the control to switch to the turned-on state, according to an environmental lightness. To be specific: An illuminance sensor not illustrated that is to measure the environmental lightness (brightness) is provided on the working vehicle, and the controller 14 acquires the brightness as measured by the illuminance sensor so as to determine, based on the brightness, whether to subject the light emitting elements 13A through 13C corresponding to the regular switches 11A through 11C to the control to switch to the turned-on state or control to switch to the turned-off state.

If the brightness as measured by the illuminance senor is lower than a specified value, for instance, the controller 14 subjects the light emitting elements 13A through 13C to the control to switch to the turned-on state. If the brightness as measured by the illuminance senor is not lower than the specified value, the controller 14 subjects the light emitting elements 13A through 13C to the control to switch to the turned-off state.

The controller 14, which subjects, based on the brightness as measured by the illuminance sensor, the light emitting elements 13A through 13C to control to switch between the turned-on and turned-off states, may additionally subject the light emitting elements 13A through 13C to the control to switch to the turned-on state according to an operation of a specified switch 11. Specifically, if, for instance, the switch 11A, to which the function to turn on and off the headlight of the working vehicle is assigned, is pushed down by the operator in a state where the light emitting elements 13A through 13C are off, the controller 14 subjects the light emitting elements 13A through 13C to the control to switch to the turned-on state.

On the other hand, the controller 14 separately subjects the light emitting elements 13D through 13F corresponding to the optional switches 11D through 11F to the control to switch between the turned-on and turned-off states, based on the corresponding function information as described above. In other words, if the working vehicle is brought into the key on state, the controller 14 performs the turning on control on the light emitting elements 13D and 13E corresponding to the functional switches 11D and 11E, to which functions are assigned, among the optional switches 11D through 11F.

Thus, in the switch device 10*a* according to the present modification, the controller 14 performs the turning on and off control on the light emitting elements 13A through 13C corresponding to the regular switches 11A through 11C under a condition different from a condition for performing the turning on and off control on the light emitting elements 13D through 13F corresponding to the optional switches 11D through 11F.

As described above, in the switch device 10*a* of the present modification, the light emitting elements 13A through 13C, which correspond to the regular switches 11A through 11C, are provided, so that a certain recognizability is maintained by bringing the light emitting elements 13A through 13C into the turned-on state even if the usage environment makes it difficult to recognize the presence of the regular switches 11A through 11C or the contents thereof.

[Modification 2]

Figure 6:
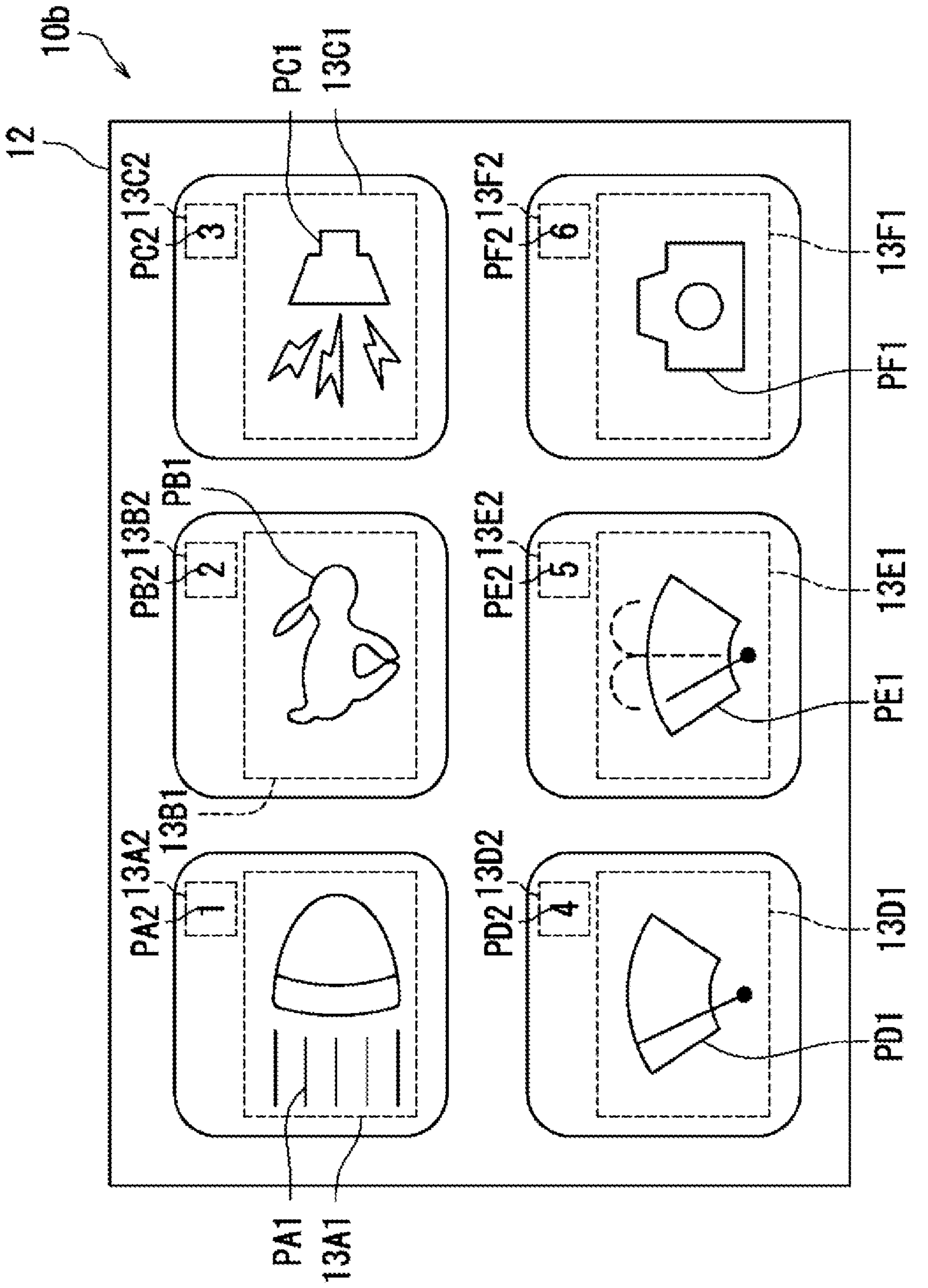
FIG. 6 is a diagram illustrating a switch device including switches each having two lighting regions.
Figure 7:
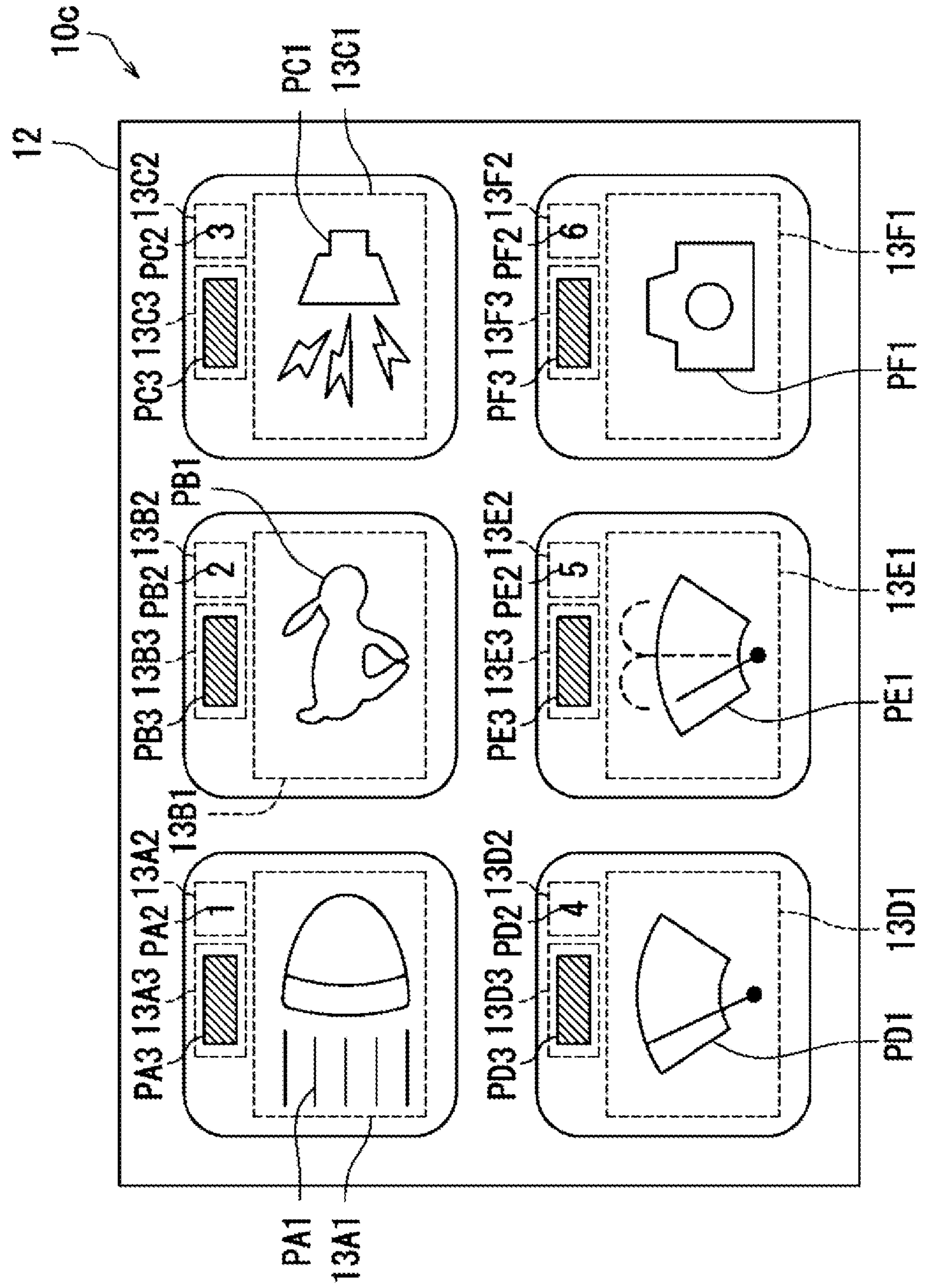
FIG. 7 is a diagram illustrating a switch device including switches each having three lighting regions.

Next, another modification of the switch device for working vehicles according to the present embodiment is described with reference to FIGS. 6 and 7. FIGS. 6 and 7 are diagrams illustrating rough configurations of switch devices of the present modification.

Switch devices 10*b* and 10*c* according to the present modification each have multiple lighting regions (functional indications) provided for each switch 11, and are each different from the switch device 10 according to the above working example in that the controller 14 is capable of changing between the turned-on and turned-off states for each lighting region. The following description is made on the switch devices 10*b* and 10*c*, focusing on differences from the switch device 10. In the present modification, it is assumed that light emitting elements 13 are arranged correspondingly to all the switches 11.

(1. Case with Two Lighting Regions)

With respect to the switch devices according to the present modification, a case with the switch device 10*b*, in which two lighting regions are provided for each switch 11, is initially described with reference to FIG. 6.

In the switch device 10*b*, the switches 11A through 11F have two kinds of lighting regions, namely, first lighting regions (functional indications PA1 through PF1) corresponding to a first function and second lighting regions (functional indications PA2 through PF2) corresponding to a second function. The switch device 10*b* includes light emitting elements 13A1 through 13F1 corresponding to the first lighting regions (functional indications PA1 through PF1) and light emitting elements 13A2 through 13F2 corresponding to the second lighting regions (functional indications PA2 through PF2), which elements are provided on the switches 11A through 11F, respectively. As will be detailed later, the first function refers to a function assignable in a first operation mode, and the second function refers to a function assignable in a second operation mode. For instance, the first operation mode refers to a mode for causing a specified function of the working vehicle to be exerted, and the second operation mode refers to a mode for using the respective switches 11 as so-called numeric keys to input numerical values (passcode input mode).

Next, a structure of the switches 11 is described taking the switch 11A as an example. The switch 11A is provided with a partition (not illustrated) so as to prevent light from the light emitting element 13A1 from being transmitted through the functional indication PA2 (translucent member 112). As a result, if the switch 11A serves as a switch for the first function, the operator only sees the functional indication PA1 glowing. The operator sees the functional indication PA1 glowing and recognizes that the switch 11A is serving as a switch for the first function.

If the switch 11A serves as a switch for the second function, the light emitting element 13A2 is so controlled as to be in the turned-on state and the light emitting element 13A1 is so controlled as to be in the turned-off state. When the controller 14 controls the light emitting element 13A2 to be in the turned-on state, the light emitting element 13A2 emits light toward the back face of the switch 11A. The emitted light is transmitted through the functional indication PA2 (translucent member 112) of the switch 11A while prevented by the partition from being transmitted through the functional indication PA1 (translucent member 112). As a result, if the switch 11A serves as a switch for the second function, the operator only sees the functional indication PA2 glowing. The operator sees the functional indication PA2 glowing and recognizes that the switch 11A is serving as a switch for the second function.

The light emitting elements 13A1 and 13A2 arranged on the switch 11A are each connected to the controller 14 through the wiring 16, and the light emitting elements 13A1 and 13A2 are individually switchable between the turned-on and turned-off states.

The controller 14 is capable of transmitting a control signal S for changing between the turned-on and turned-off states, for each of the light emitting elements 13A1 and 13A2. Therefore, in the switch 11A, the switch between the turned-on and turned-off states is carried out for each of the lighting regions (functional indications PA1 and PA2).

In addition, the controller 14 is capable of transmitting control signals S differing from lighting region to lighting region and capable of, for instance, separately changing the optional switches 11D through 11F between the turned-on and turned-off states for the first lighting regions (the functional indication PA1) and collectively changing all the switches 11A through 11F between the turned-on state and the turned-off state for the second lighting regions (the functional indication PA2).

For instance, if the switches 11A through 11F are caused to serve as a switch for the second function, the controller 14 subjects all the light emitting elements 13A2 through 13F2 corresponding to the functional indications PA2 through PF2 to the control to switch to the turned-on state.

If the switches 11A through 11F are caused to serve as a switch for the first function, the controller 14 subjects the light emitting elements 13D1 and 13E1 corresponding to the functional indications PD1 and PE1 to the control to switch to the turned-on state.

As illustrated in FIG. 6, to first indication regions of the switches 11A through 11F, the functional indications PA1 through PF1, which indicate functions assignable in the first operation mode, are attached. Similarly to the case with the switch device 10, the functional indication PA1, which indicates a headlight turning on and off function, is attached to the switch 11A, and the functional indication PB1, which indicates an engine speed regulation function, and the functional indication PC1, which indicates a sound output function, are attached to the switch 11B, with the functions being assumed as regular functions. The functional indication PD1, which indicates a wiper function, is attached to the switch 11D, the functional indication PE1, which indicates a washer function, is attached to the switch 11E, and the functional indication PF1, which indicates a camera function, is attached to the switch 11F, with the functions being assumed as optional functions. In FIG. 6, the functional indications PA1 through PF1 are illustrated with solid lines irrespective of their lighted or unlighted states.

To the second lighting regions, numerical values capable of being input in the passcode input mode as the second operation mode are attached. For instance, a function to input the figure “1” to an operation device (monitor) of the working vehicle is assigned to the switch 11A. In FIG. 6, the functional indications PA2 through PF2 are illustrated with solid lines irrespective of their lighted or unlighted states, as is the case with the functional indications PA1 through PF1 as above.

Similarly, functions to respectively input the figures “2” through “6” to the operation device or the like are assigned to second indication regions of the switches 11B through 11F. The operator recognizes, by the functional indications PA2 through PF2, that functions corresponding to a second mode are assigned to the switches 11A through 11F, for instance.

As described above, the switches 11A through 11F are capable of being switched in the assigned functions according to the operation mode.

If supposed to be an unfunctional switch, the switch 11F is not operable in the first operation mode while operable in the second operation mode.

If the operator inputs, to the operation device of the working vehicle, an instruction to switch the switch device 10*b* to the second operation mode, for instance, the controller 14 implements control in accordance with such operation instruction so that the switches 11A through 11F may exert the functions in the second operation mode. As a result, numerical value input responding to the switches 11A through 11F is made possible.

(2. Case with Three Indication Regions)

The switch device 10*c*, in which the switches 11A through 11F each have more lighting regions (functional indications P), is then described with reference to FIG. 7. FIG. 7 is a diagram illustrating the switch device 10*c*, which includes switches 11A through 11F each having three lighting regions.

In the switch device 10*c*, the switches 11A through 11F have functional indications PA3 through PF3 (third lighting regions), respectively, in addition to the functional indications PA1 through PF1 (first lighting regions) and the functional indications PA2 through PF2 (second lighting regions) as above. The switch device 10*c* includes light emitting elements 13A3 through 13F3 provided correspondingly to the functional indications PA3 through PF3, in addition to the light emitting elements 13A1 through 13F1 and 13A2 through 13F2. The functional indications PA3 through PF3 are each in a rectangular shape, for instance. The functional indications PA3 through PF3 are not limited to the rectangular shape but may have any shape allowing the operator to recognize the turning on or turning off and the emission colors of the light emitting elements 13A3 through 13F3.

The light emitting elements 13A3 through 13F3 are each connected to the controller 14, and are separately controlled by the controller 14 with respect to the turning on or the turning off, according to states of the functions assigned to the switches 11, as is the case with the above light emitting elements 13A1 through 13F1 and light emitting elements 13A2 through 13F2.

The switches 11A through 11F are each connected to the controller 14 through the wiring 16, and operation signals indicating switch operations are transmitted to the controller 14 if the operator operates the switches 11A through 11F. The controller 14 generates control signals S based on the operation signals and transmits the generated signals to the light emitting elements 13A3 through 13F3. It is thus possible to switch the light emitting elements 13A3 through 13F3 between the turned-on and turned-off states according to states of operation of the switches 11A through 11F.

In the switch device 10*c* as above, the functional indications PA3 through PF3 (third lighting regions) are switched between the lighted and unlighted states so as to notify the operator of the states of operation of the switches 11A through 11F, that is to say, of states of movement of the working vehicle that correspond to the functions of the switches 11A through 11F.

For instance, if the switch 11A is operated by the operator, an operation signal indicating that the switch 11A has been operated is transmitted to the controller 14. The controller 14, which has received the operation signal, transmits a control signal S to the light emitting element 13A3. Thus, the third lighting region (functional indication PA3) of the switch 11A comes into the lighted state and the operator is notified that the headlight of the working vehicle is on.

[Modification 3]

Next, yet another modification of the switch device according to the present embodiment is described. In a switch device according to the present modification, the light emitting elements 13 are changeable in emission color or emission intensity according to a state of the working vehicle, in which the switch device 10 is installed. In the present modification, the light emitting elements 13 are constituted of multiple monochrome LEDs combined with one another, for instance, and the controller 14 subjects each monochrome LED to the turning on control or the turning off control so as to switch the light emitting elements 13 in emission color or emission intensity.

The controller 14 is connected to the respective switches 11A through 11F through the wiring 16, and connected to a detector of the working vehicle through an input and output part 25. The controller 14 receives operation signals from the switches 11A through 11F and detection signals generated by the detector of the working vehicle. Based on the operation signals or the detection signals, the controller 14 changes the light emitting elements 13 in emission color or emission intensity. The following description is made, by giving examples, on control implemented by the controller 14 so as to change the light emitting elements 13 in emission color or emission intensity.

(1. Notification of State of Movement)

Description is initially made on an example where the light emitting elements 13 are changed in emission color so as to notify of functions (states of movement of devices on the working vehicle) corresponding to the switches 11. For the functional switch 11D, for instance, the light emitting element 13D comes into the turned-on state and the functional indication PD glows white if the working vehicle comes into a moving state (the key on state). In this way, the operator is notified that the corresponding wiper function is assigned to the functional switch 11D.

If the operator operates the functional switch 11D at this time, a wiper of the working vehicle moves and the emission color of the light emitting element 13D changes into blue so as to make the functional indication PE glow blue. Thus, the operator is notified that the wiper is moving.

Specifically, the controller 14 receives an operation signal from the switch 11D or a detection signal from the detector, which detects the movement of the devices on the working vehicle, and acquires a situation of movement of the wiper of the working vehicle. Based on the acquired situation of movement, the controller 14 implements control to switch the emission color of the light emitting element 13D responding to the corresponding switch 11D.

In the switch device 10, it is possible to change the emission intensity so as to notify of a movement level if the functions (states of movement of the devices on the working vehicle) corresponding to the switches 11 change in phases. If a movement speed of wiper movement in the working vehicle is changeable, for instance, the wiper of the working vehicle moves when the switch 11D is operated once, and the movement of the wiper becomes faster when the switch is operated once again. If the movement of a device changes in phases as stated above, the emission intensity of the light emitting element 13D, for instance, is changed so as to notify of a wiper movement speed. In the above example, the movement level is expressed by changing the light emitting elements 13 in emission intensity, while such expression is non-limitative and the movement level may be expressed by changing the light emitting elements 13 in emission color.

(2. Notification of Abnormality)

Next, description is made on an example where the light emitting element 13D is changed in emission color so as to notify of an abnormal state of a function (device on the working vehicle) corresponding to a switch 11.

For instance, the controller 14 monitors a specified function of the working vehicle for whether to be normally exerted, and controls the emission color of the light emitting element 13 of the switch 11, to which the function is assigned, based on the result of monitoring. As an example, the controller 14 monitors a wiper corresponding to a function to move a wiper, which function is assigned to the switch 11D, for whether to normally move, and controls the emission color of the light emitting element 13D responding to the switch 11D to be "white" if there are no abnormalities in the wiper and controls the emission color of the light emitting element 13D to be "red" if there is an abnormality in the wiper. As a result, the operator is notified that the wiper is normal or abnormal. In the notification of an abnormal state, it is also possible to change the turned-on state of the light emitting elements 13 to a flashed state.

(3. Notification of Characteristic)

Next, description is made on an example where the light emitting elements 13 are changed in emission color so as to notify of characteristics of the functions (devices on the working vehicle) corresponding to the switches 11. For instance, the controller 14 controls the emission colors of the light emitting elements 13 based on the characteristics of the functions of the working vehicle, which functions are assigned to the switches 11. As an example, the controller 14 refers to the corresponding function information so as to control the emission color of the light emitting element 13F to be "red", a color reminding attention, for the switch 11F, to which the camera function is assigned. As a result, the operator is notified that attention should be paid to the camera image.

Thus, in the switch device 10 according to the present modification, the light emitting elements 13 are changed in emission color or emission intensity so as to notify of the states of the functions assigned to the switches, and the like. Consequently, it is possible to notify of the states of the devices provided on the working vehicle, and the like even if multiple lighting regions (functional indications P) cannot be provided unlike the case with the above switch device b.

As described above on the switch device according to the present embodiment by giving several working examples, in the switch device according to the present embodiment, the optional switches 11D through 11F are individually switched between the lighted and unlighted states so as to make it possible to distinguish an available switch (functional switch) and an unavailable switch (unfunctional switch) from each other. Therefore, a single switch device is allowed to correspond to multiple working vehicles different in model or specifications from one another, which reduces production costs.

With respect to the regular switches 11A through 11C, the corresponding light emitting elements 13A through 13C are provided so as to switch the regular switches between the lighted and unlighted states according to the usage environment. In particular, the light emitting elements 13A through 13C are collectively switched between the turned-on and turned-off states, which clears up complicatedness of a changing operation.

Second Embodiment

Next, a switch system for working vehicles according to the present embodiment is described. The switch system according to the present embodiment is a switch system for operating a working vehicle, and is constituted of a switch device including switches and light emitting elements, and an external device including a controller. The external device is a main control device 30 of the working vehicle, for instance.

Figure 8:
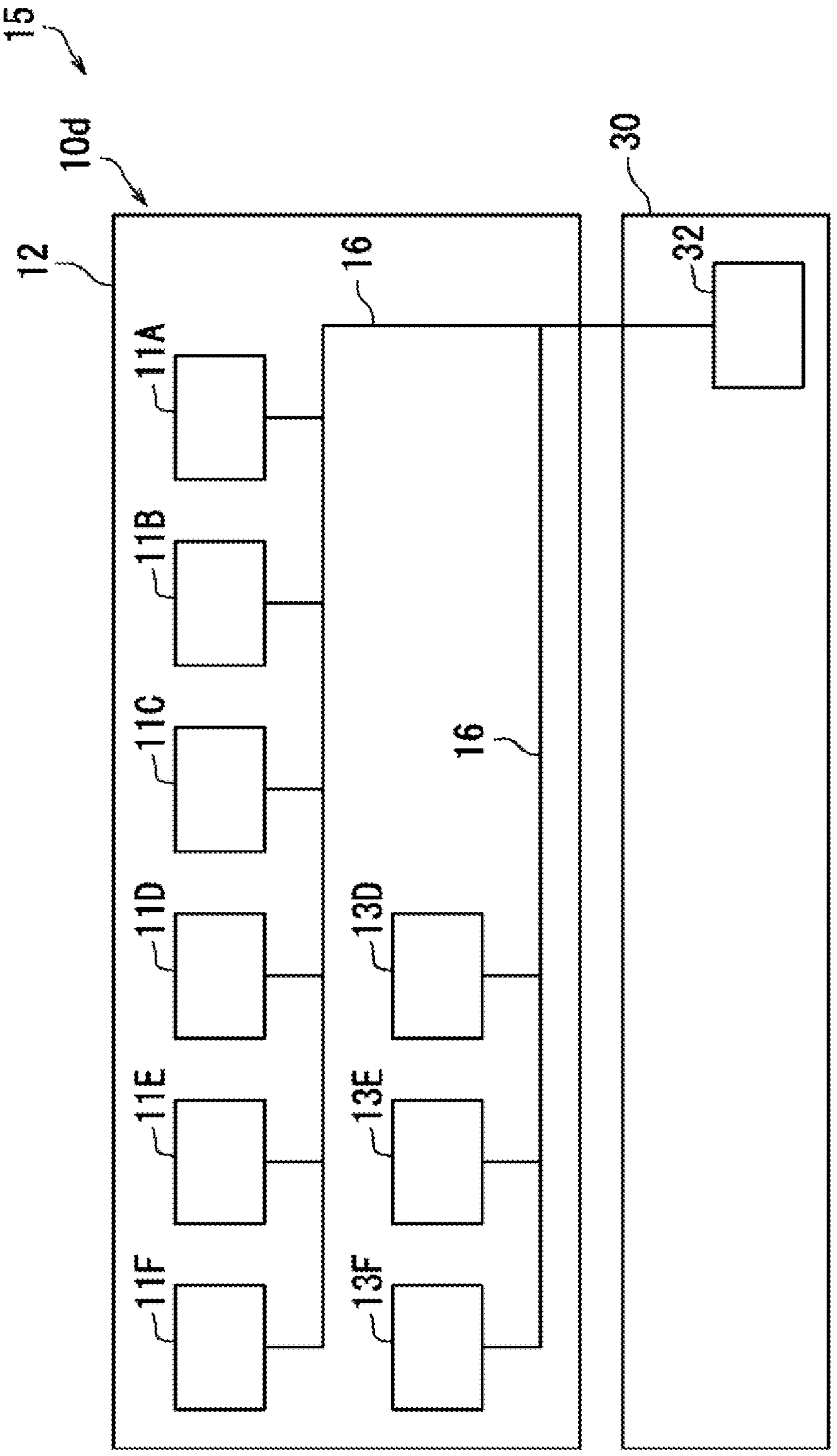
FIG. 8 is a block diagram illustrating a switch system.

As illustrated in FIG. 8, a switch system 15 of the present embodiment is constituted of a switch device 10*d* and the external device. The switch device 10*d* includes a device body 12 and multiple switches 11. At least some of the switches 11 are optional switches 11D through 11F, and the other switches are regular switches 11A through 11C. On the optional switches 11D through 11F, corresponding light emitting elements 13D through 13F are arranged, respectively. In the switch system 15, the switches 11D and 11E are each assumed as a functional switch, and the switch 11F is assumed as an unfunctional switch. The switches 11 and the light emitting elements 13 are connected, through wiring 16, to a controller 32 provided on the external device.

In the switch system 15, which has the configuration as above, the controller 32 of the external device transmits control signals S to the light emitting elements 13D and 13E corresponding to the functional switches 11D and 11E, based on a start-up signal from the working vehicle. If receiving the control signals S, the light emitting elements 13D and 13E come into the turned-on state.

Thus, according to the switch system 15, the optional switches 11D through 11F are separately switched between the lighted and unlighted states, as is the case with the switch device 10 as above. Consequently, it is possible to visually distinguish the functional switches 11D and 11E, to which functions are assigned, and the unfunctional switch 11F, to which no functions are assigned, from each other.

The controller 32 is arranged in the external device, which is provided separately from the switch device 10*d*, so that it is possible to use the switch device 10*d*, which is commonly on the market, to form the switch system 15, which improves the versatility of the switch system and holds the production costs down.

The switch system 15 according to the present embodiment as described above is non-limitative, and various changes can be made. For instance, arrangement of light emitting elements 13A through 13C on the regular switches 11A through 11C makes it possible to switch the regular switches between the lighted and unlighted states according to the usage environment for the working vehicle.

Multiple lighting regions (functional indications P) may be provided for each of the switches 11A through 11F so as to switch the lighting regions from operation mode to operation mode. Furthermore, the light emitting elements 13 may be made changeable in emission color or emission intensity.

Third Embodiment

Figure 9:
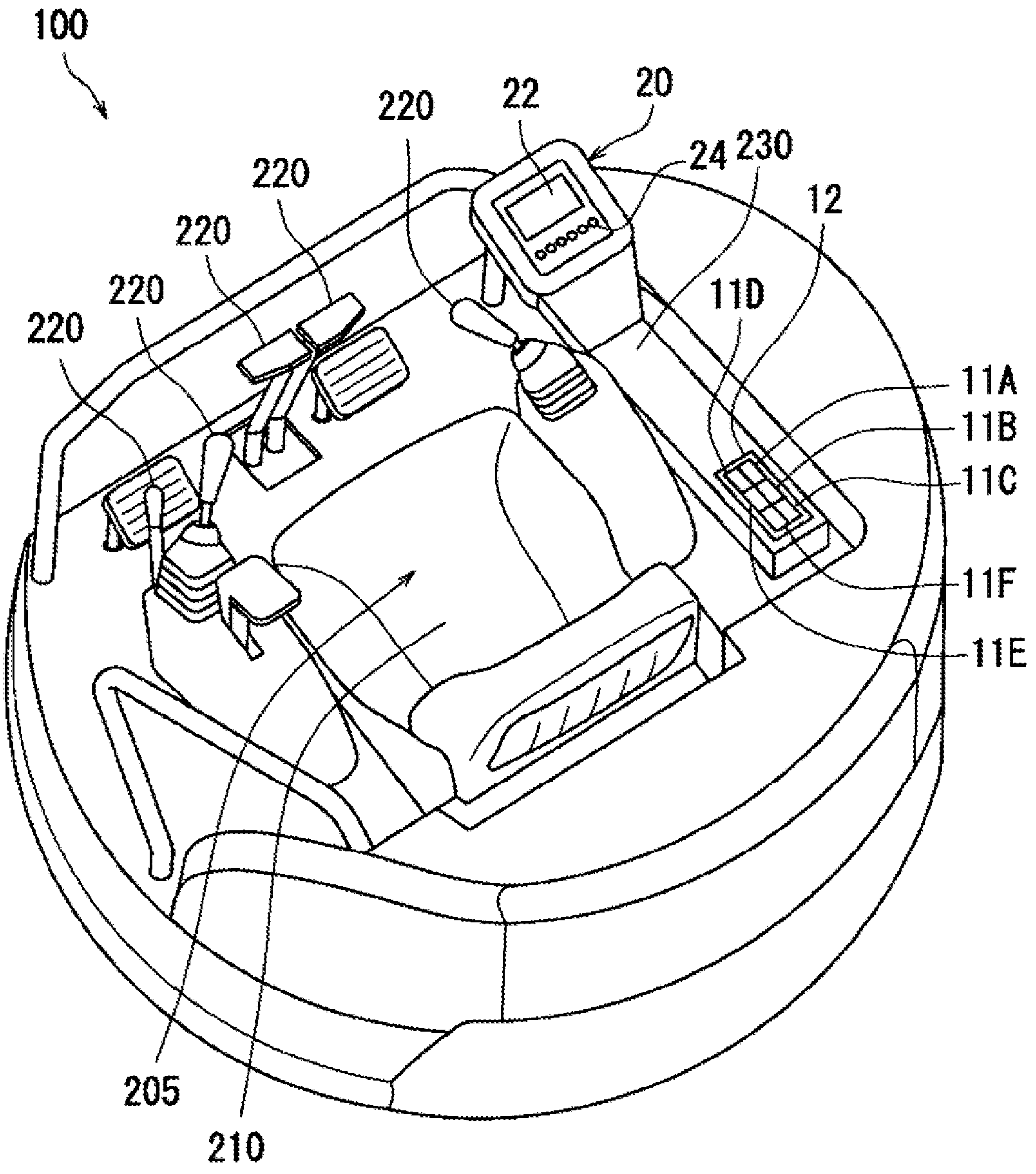
FIG. 9 is a perspective view illustrating a cockpit of a working vehicle.
Figure 10:
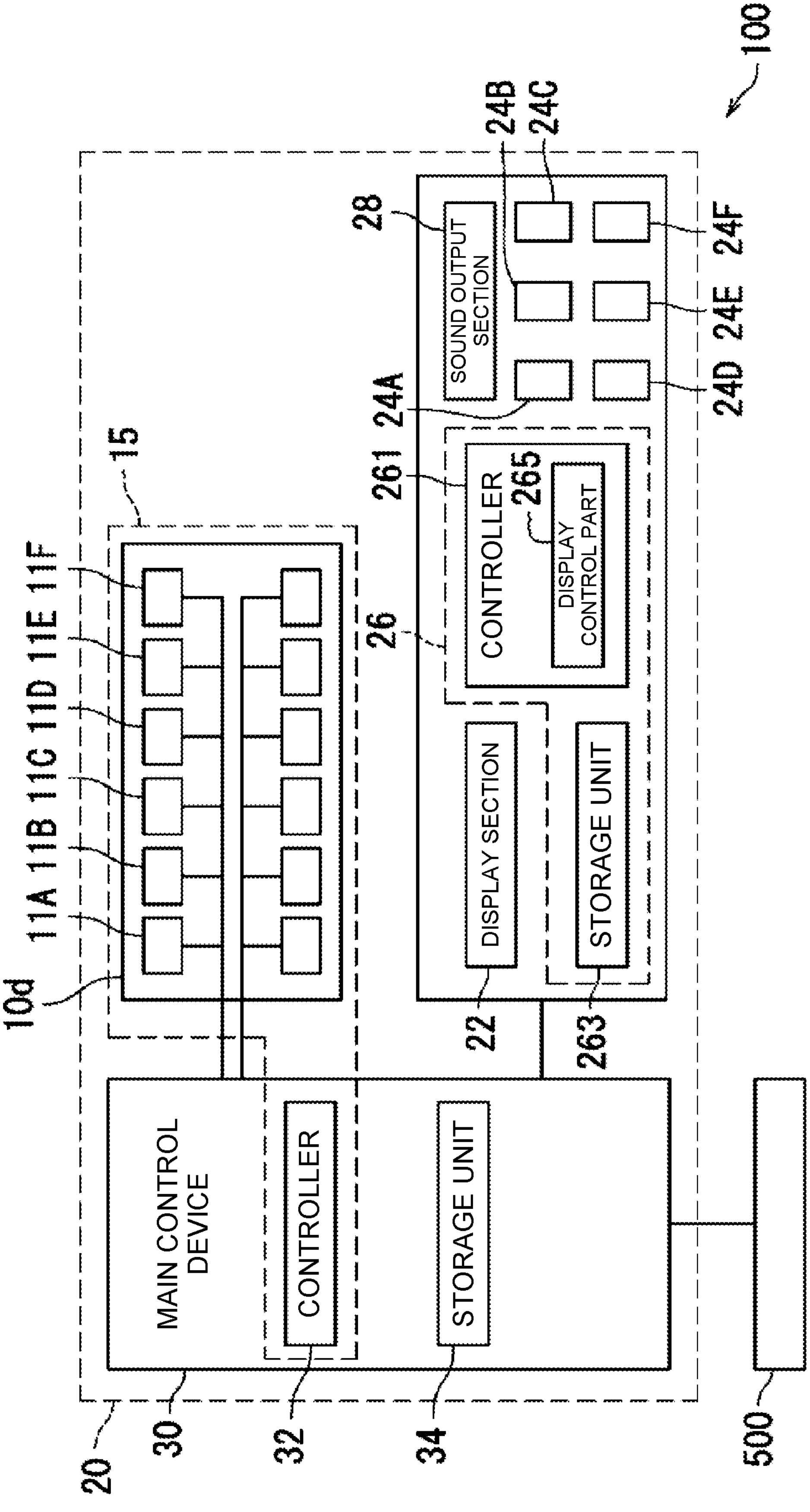
FIG. 10 is a block diagram illustrating the working vehicle.

Next, a working vehicle equipped with the above switch system is described with reference to FIGS. 9 and 10. FIG. 9 is a diagram illustrating a rough configuration of principal components of a working vehicle of the present embodiment, and FIG. 10 is a block diagram of the working vehicle. In the present embodiment, the switch system of the second embodiment is applied to the working vehicle for convenience of description, while such application is non-limitative and the switch device of the first embodiment may be applied.

The working vehicle according to the present embodiment is a construction machine or an agricultural machine, for instance, and a hydraulic shovel as a construction machine is taken as an example in the description made in the present embodiment. Initially referring to FIG. 9, a working vehicle according to an embodiment of the present invention is described. FIG. 9 is a perspective view illustrating a cockpit 205 of a working vehicle 100.

As illustrated in FIG. 9, the working vehicle 100 includes the cockpit 205. In the cockpit 205, an operation device 20, the device body 12, a seat 210, multiple operation levers 220, and an arrangement member 230 are arranged. The seat 210 is to be taken by an operator. The operator refers to an operator of the working vehicle 100. The operation levers 220 each receive an operation by the operator. The operation levers 220 are operation members for operating the working vehicle 100.

The operation device 20 receives an operation by the operator so as to carry out operation of the working vehicle 100, input of various kinds of information to the working vehicle 100, and display of various kinds of information concerning the working vehicle 100.

The operation device 20 displays various kinds of information and receives an operation by the operator. The operation device 20 includes a display section 22 and multiple push buttons 24. The display section 22 displays various kinds of information concerning the working vehicle 100. For instance, the display section 22 displays a state of the working vehicle 100, a GUI (graphical user interface) or a camera image. The display section 22 is constituted of a liquid crystal display or an organic electroluminescence display, for instance. The display section 22 may include a touch panel. In that case, each push button 24 may be displayed on the display section 22 as a widget of the GUI.

The operation device 20 further includes a display control device 26 and a sound output section 28. The display control device 26 controls the display section 22. The display control device 26 is constituted of an ECU, for instance. The sound output section 28 outputs a sound. The sound output section 28 is constituted of a speaker or a buzzer, for instance.

Specifically, the display control device 26 includes a controller 261 and a storage unit 263. The controller 261 includes a processor such as a CPU (central processing unit). The storage unit 263 includes a storage and stores data and computer programs. Specifically, the storage unit 263 includes a main storage such as a semiconductor memory, and an auxiliary storage such as a semiconductor memory, a solid-state drive, and/or a hard disk drive. The storage unit 263 may include removable media. The storage unit 263 is equivalent to an example of a non-transitory computer readable storage medium.

The controller 261 outputs, to the main control device 30, various kinds of information input or set according to the operation of a screen displayed on the display section 22.

The controller 261 includes a display control part 265. Specifically, the processor of the controller 261 executes the computer programs stored in the storages of the storage unit 263 and thus serves as the display control part 265. The display control part 265 controls the display section 22. For instance, the display control part 265 controls a screen displayed on the display section 22 according to operation information (ON information or OFF information) indicating that push buttons 24A through 24F have or have not been pushed down.

The main control device 30 controls the switch device 10*d*, the operation device 20, and an engine section 500. The main control device 30 is constituted of an ECU, for instance. The main control device 30 is equivalent to the external device in the switch system of the second embodiment.

Specifically, the main control device 30 includes the controller 32 and a storage unit 34. The controller 32 includes a processor such as a CPU. The storage unit 34 includes a storage and stores data and computer programs. The storage unit 34 also stores corresponding function information that indicates a correspondence relationship between the switches 11A through 11F and functions assigned to the respective switches 11. The storage unit 34 has a hardware configuration similar to a hardware configuration of the storage unit 263, for instance. The corresponding function information is registered during the manufacture of the working vehicle 100, for instance.

The controller 32 acquires, from the controller 261 of the display control device 26, various kinds of information input or set according to the operation of a screen displayed on the display section 22.

In addition, the controller 32 acquires operation information on the switches 11A through 11F from the switch device 10*d*. The controller 32 refers to the corresponding function information in the storage unit 34 so as to control a function responding to the acquired operation information.

On the other hand, the controller 32 outputs various kinds of information on the working vehicle 100 and a movement signal indicating a situation of movement to the switch device 10*d*. Various kinds of information include the corresponding function information. The movement signal refers to a start-up signal indicating the start-up (key on) of the working vehicle 100, for instance.

If the working vehicle 100 according to the present embodiment, which has the configuration as above, is started up by the operator, the controller 32 receives the start-up signal and transmits the control signals S to the light emitting elements 13D and 13E of the switch device 10*d*. As a result, the functional switches 11D and 11E are made operable, and the light emitting elements 13D and 13E notify that the functional switches are operable.

If the regular switches 11A through 11C or the functional switches 11D and 11E of the switch device 10*d* are operated by the operator, operation signals output by the switches 11A through 11E are transmitted to the controller 32 of the working vehicle 100. As a result, the working vehicle 100 moves according to the switch operation by the operator.

The embodiments of the present invention have been described above with reference to the drawings (FIGS. 1 through 10). The present invention, however, is not limited to the above embodiments but can be carried out in various modes without departing from the gist of the invention. The drawings chiefly illustrate the respective components in a schematic manner for an easier understanding, and the thickness, length, number, and the like of the respective components as illustrated are different from true ones for convenience of drawing preparation. The material, shape, size, and the like of the respective components are mentioned in the above embodiments by giving examples and are not particularly limited, so that it is possible to make various changes without essentially departing from the effects of the present invention.

INDUSTRIAL APPLICABILITY

The present invention is usable for the field of switch control provided on a working vehicle.

DESCRIPTION OF REFERENCE NUMERALS

10 Switch device
11, 11A through 11F Switch
12, 12A through 12C Device body
13, 13A through 13F Light emitting element
15 Switch system
20 Operation device
28 Sound output section
14, 32 Controller
100 Working vehicle
PA through PF Functional indication

The invention claimed is:

1. A working vehicle comprising:
- a switch device, wherein the switch device is switchable between a first operation mode and a second operation mode, and
- a plurality of switches, wherein the plurality of switches comprise:
  - a functional subset of switches, wherein a corresponding specific function is assigned to each switch in the functional subset of switches,
  - a non-specific subset of switches, wherein no specific function is assigned to switches comprised in the non-specific subset of switches, and
  - wherein the plurality of switches is comprised in the switch device and wherein:
    - each switch of the plurality of switches is associated with and controls a corresponding first light emitting region and a corresponding second light emitting region distinct from the first light emitting region, and
    - the corresponding first light emitting region is turned on in the first operation mode of the switch device, and the corresponding second light emitting region is turned on in the second operation mode of the switch device.

2. The working vehicle according to claim 1, wherein, upon switching from the second operation mode to the first operation mode, the second light emitting region is turned off and the first light emitting region is turned on.

3. The working vehicle according to claim 1, wherein the first light emitting region is formed wider than the second light emitting region.

4. The working vehicle according to claim 1, wherein the first light emitting region is disposed adjacent to the second light emitting region.

5. The working vehicle according to claim 1, wherein the work vehicle further comprises:
- a monitor, wherein, in the second operation mode, the second light emitting region is provided with numerals capable of being input to the monitor.

6. The working vehicle according to claim 5, wherein, when the working vehicle enters a key-on state, the second light emitting region is turned on.

7. A working vehicle comprising:
- a switch device, wherein
  - the switch device is switchable between a first operation mode and a second operation mode under a predetermined condition and when the working vehicle enters a key-on state, and the second operation mode starts when the working vehicle enters the key-on state; and a plurality of switches, wherein the plurality of switches comprise:

a functional subset of switches, wherein a corresponding specific function is assigned to each switch in the functional subset of switches, a non-specific subset of switches, wherein no specific function is assigned to switches comprised in the non-specific subset of switches, and, wherein, the plurality of switches is comprised in the switching device, each switch of the plurality of switches is associated with a first light emitting region and a second light emitting region distinct from the first light emitting region, and the first light emitting region is turned on in the first operation mode, and the second light emitting region is turned on in the second operation mode.

8. A working vehicle comprising:

a switch device, plurality of switches, wherein the plurality of switches comprise:

a functional subset of switches, wherein a corresponding specific function is assigned to each switch in the functional subset of switches, a non-specific subset of switches, wherein no specific function is assigned to switches comprised in the non-specific subset of switches, and, wherein, the plurality of switches is comprised in the switch device, and each switch in the plurality of switches is associated with a first light emitting region and a second light emitting region distinct from the first light emitting region, and each switch in the plurality of switches is associated with a corresponding function, wherein the operation state of the corresponding function is indicated by at least one of turning on the first light emitting region, turning on the second light emitting region, or changing a light emission color of the first light emitting region.

9. The working vehicle according to claim 8, wherein the corresponding operation state indicates one or more of whether the corresponding function is:

in operation, in an abnormal state, or in a state requiring attention.

* * * * *